United States Statutory Invention Registration [19]

[11] Reg. Number: H333

Curtis [43] Published: Sep. 1, 1987

[54] NONIMAGING IDENTIFICATION STRUCTURE

[75] Inventor: Richard A. Curtis, Huntsville, Ala.

[73] Assignee: The United States of America as represented by the Secretary of the Army, Washington, D.C.

[21] Appl. No.: 881,369

[22] Filed: Jul. 3, 1986

[51] Int. Cl.[4] ..... H04B 9/00

[52] U.S. Cl. ..... 455/608; 455/617

*Primary Examiner*—Stephen C. Buczinski
*Assistant Examiner*—Linda J. Wallace
*Attorney, Agent, or Firm*—Harold W. Hilton; Freddie M. Bush; John C. Garvin, Jr.

[57] ABSTRACT

A nonimaging technique for identification of a ground vehicle as a nontarget utilizing a pulsing infrared wavelength energy source located on the ground vehicle and a matched receiver at the point making the identification. The transmitter is designed to not increase the vehicle infrared signature nor to be easily duplicated by target vehicles. The receiver allows continuous identification of detected vehicles in a highly discriminating system.

6 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NONIMAGING IDENTIFICATION STRUCTURE

DEDICATORY CLAUSE

The invention described herein may be manufactured, used, and licensed by or for the Government for governmental purposes without the payment to me of any royalties thereon.

BACKGROUND OF THE INVENTION

There is no known, currently-used nonimaging technique for identification of U.S. Army ground or air vehicles as friend or foe. However, some high performance aircraft may have some interrogate/respond techniques which operate at radio frequencies. There is considerable effort being made to develop a laser radar for noncooperative identification, friend or foe. The problem is that current imaging infrared viewing devices can sense a potential target at ranges beyond the ability of an operator to determine identification.

It is the purpose of this disclosure to present a technique whereby a target identification can be made without a detailed image.

Apparatus of the present invention can be used with all ground vehicles or helicopters. The advantages of this system is that it lends itself to multiple coding techniques for security; it does not increase the existing detectability of the vehicle; nor does it require the interrogating system (such as a missile launcher or another vehicle) to emit any signals.

DESCRIPTION OF THE PREFERRED EMBODIMENT

Figure 1:
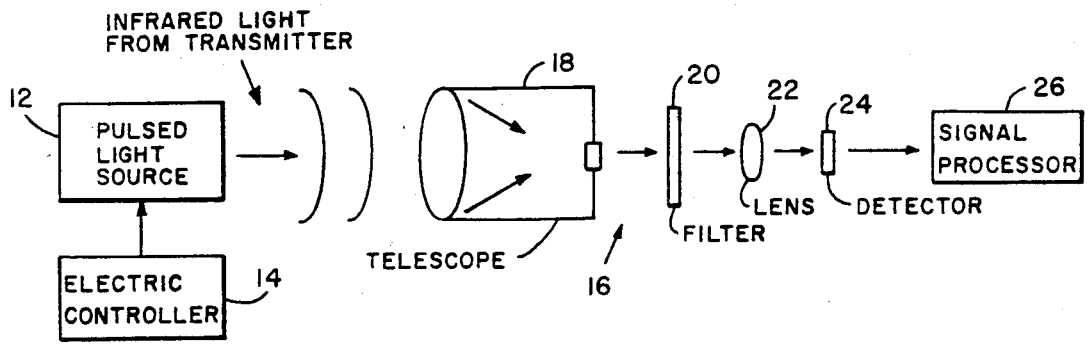
FIG. 1 shows the components of the non-imaging identification system in their relative positions.

As seen in FIG. 1, the nonimaging identification system 10 of the present invention includes a pulsed light source 12 (transmitter) which may be a $CO_2$ laser or an incandescent discharge device. The light source 12 is driven by a time or time and wavelength varying electric controller 14.

The receiver 16 is disposed to receive infrared energy from the target and includes a telescope 18 and optical filter 20 which is matched to the transmitter 12. A lens 22 and detector 24 are interposed between filter 20 and a signal processor 26.

Figure 2:
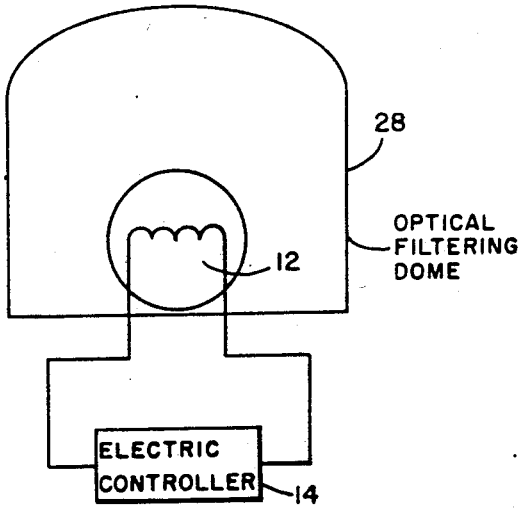
FIG. 2 illustrates the use of an optical filter dome over the electric controller.

A signal is generated by a pulsed light source 12 which is driven by the time or time and frequency varying electrical controller 14. The electrical controller 14 may vary the energy emitted by the pulsed light source 12 to change the wavelength of maximum energy emission or to respond to changes in background noise sources. Wavelength changes of a $CO_2$ laser or laser diode are made using known, published techniques. As seen in FIG. 2 an optical filtering dome 28 is provided to prevent the emission of any visible light from the transmitter and may be designed to selectively transmit only a narrow band of infrared light. Material of the dome is standard "IR" filtering materials using multilayer, interference coatings combined with bulk absorption. A cooling system (not shown) may be used to control heating of the dome 28 and light source 12.

The amount of energy emitted by the transmitter should be approximately the same as the hottest area of the vehicle in the selected wavelength band so that the transmitter will not increase the broad-band (or general) detectability of the vehicle on which it is mounted.

The transmitter is mounted such that it is in proximity to other areas of infrared emission on the vehicle. The number of transmitters that is used on each vehicle is selected for detection from any angle at required ranges.

The telescope of the receiver collects infrared energy from the vehicle. The telescope 18 should be aligned with, and may be part of, a passive infrared viewer (not shown). The light from the telescope passes through optical filter 20 which is selected to match the optical filtering dome 28 in transmitting wavelength. A lens or set of lenses 22 concentrates the filtered light onto a detector 24 which detects any wavelength of interest or may be matched to a particular filter 20. Known electronic techniques are used in signal processor 26 to determine the presence of the pulse modulated light emitted by the pulsed light source 12.

When the vehicle is being located in an area where it might be confused with a target vehicle, optical filtering dome 28 is put in place over the pulsed light source. The filter may be determined by a central controller to be used by all vehicles at that period of time, from a set of such filters. The electrical controller 14 for the pulsed light source is then set for a pulse repetition frequency which is selected by the central controller for that period of time.

The result is that a vehicle is emitting a signal with a known wavelength and pulse repetition frequency. The intensity of the signal is set so that it is about the same as the hottest infrared source on the vehicle without the pulsed light source.

A passive sensor located on a distant vehicle or missile launcher or gun senses the emitted pulsed light and identifies the vehicle as a non target.

The emission level and frequency of the pulsed light source should be chosen so that a passive imaging sensor without wavelength and pulse frequency detection ability would not be any more likely to detect the vehicle than without the pulsed light source.

I claim:

1. Apparatus for nonimaging identification of a vehicle comprising:

a. a pulsed light source transmitter carried by said vehicle for emitting infrared radiation at a level which does not exceed the vehicle's infrared signature;

b. a receiver remotely located from said source to receive said infrared radiation;

c. first filter means carried by said pulsed light source transmitter for passing said infrared radiation at a predetermined frequency;

d. second filter means carried by said receiver for matching said wavelength of said passed infrared radiation;

e. detector means carried by said receiver for detecting said filtered infrared radiation and providing an output signal; and f. signal processing means carried by said receiver for receiving said output signal from said detector means and determining the identification of said detected filtered infrared radiation.

2. Apparatus as in claim 1 wherein said pulsed light source transmitter includes electronic control means for pulsing said emitted infrared radiation.

BEST AVAILABLE COPY

3. Apparatus as in claim 2 wherein said first filter means is a dome filter selected for filtering said emitted infrared radiation for a predetermined time.

4. Apparatus as in claim 3 wherein said receiver includes a telescope for receiving said emitted infrared radiation and directing said emitted infrared radiation to said second filter means and collimating means for concentrating the filtered infrared radiation.

5. Apparatus as in claim 4 wherein said pulsed light source transmitter is an infrared wavelength emitting laser.

6. Apparatus as in claim 5 wherein said infrared emitting laser is a $CO_2$ laser.

* * * * *